TELEPHONE CALL SURVEYING EQUIPMENT

Filed April 21, 1955

INVENTOR
WM. H. BLASHFIELD
BY
Brown, Jackson, Boettcher & Dienner
attys

Feb. 24, 1959 W. H. BLASHFIELD 2,875,286

TELEPHONE CALL SURVEYING EQUIPMENT

Filed April 21, 1955 5 Sheets-Sheet 2

INVENTOR.

WM. H. BLASHFIELD

BY *Brown, Jackson, Boettcher & Dienner* attys.

Feb. 24, 1959 W. H. BLASHFIELD 2,875,286

TELEPHONE CALL SURVEYING EQUIPMENT

Filed April 21, 1955 5 Sheets-Sheet 3

INVENTOR.
WM. H. BLASHFIELD
BY
Brown, Jackson, Boettcher & Dienner
attys.

Feb. 24, 1959 W. H. BLASHFIELD 2,875,286

TELEPHONE CALL SURVEYING EQUIPMENT

Filed April 21, 1955 5 Sheets-Sheet 4

INVENTOR.
WM. H. BLASHFIELD
BY Brown, Jackson, Boettcher & Dienner
Attys.

INVENTOR.
WM. H. BLASHFIELD
BY Brown, Jackson
Boettcher & Dienner
Attys.

United States Patent Office 2,875,286
Patented Feb. 24, 1959

2,875,286

TELEPHONE CALL SURVEYING EQUIPMENT

William H. Blashfield, Galion, Ohio, assignor to North Electric Company, a corporation of Ohio Application April 21, 1955, Serial No. 502,925
17 Claims. (Cl. 179—175.2)

The present invention relates to automatic telephone systems, and particularly to a novel arrangement for surveying P. B. X trunk calls to distant exchanges.

The present disclosure teaches a novel arrangement for surveying trunk calls as made by the subscribers of a private branch exchange, and specifically teaches several preferred and novel applications of the novel call survey equipment. In one application, the call survey equipment is used to screen the calls as placed, the equipment being operative to allow certain of the calls to be completed through an associated city exchange, and being operative to block others of the calls from being completed through such exchange. In another application, the call survey equipment is utilized to provide a traffic study record to indicate to the management the necessity or desirability of trunk screening from the management standpoint. The two applications, of course, can be included in the same exchange if desired.

The general setting of the arrangement for screening private branch exchange (P. B. X) trunk calls may be found in a copending United States patent application, Serial Number 443,068, which was filed by C. C. Crow and J. G. Bonnar, and which was assigned to the assignee of this invention. As there taught, in the case of P. B. X installations having access to a city exchange which is provided with extended area dialing and automatic toll ticketing of such calls, it frequently becomes desirable from the point of view of the party who pays the P. B. X telephone bills, to restrict extended area or toll calls over the P. B. X automatic city trunks. This is especially the case when the P. B. X involves a large number of users, and it is difficult to keep a record as to the identity of the calling subscriber.

It is an object of the present invention to provide equipment which is operative to examine each extended area call as made by the subscribers of an exchange, and to prevent the extension of such calls by a certain group of subscribers to certain predetermined ones of the extended areas.

Another object of the present invention is to provide a surveying arrangement which includes a reduced amount of equipment, and which requires few interconnecting leads whereby the equipment may be readily connected for use in different exchanges at different times.

Another object of the present invention is to provide an arrangement whereby with optional wiring the same surveying equipment can be used (*a*) only for traffic study purposes; (*b*) initially for traffice study and subsequently for trunk screening; or (*c*) for both at the same time.

More specifically, according to the invention the equipment is made sufficiently compact and portable to permit expeditious connection of the equipment to existing P. B. X exchanges for predetermined study periods. During each such study period, the exchanges are divided into groups, certain of which are marked as "restricted" exchanges and others of which are marked as "allowed" exchanges. The equipment examines each of the extended area calls made by the subscribers of the P. B. X exchange, and maintains a record of calls attempted to the various groups of exchanges in the extended areas. After the tests have been completed, the equipment may be disconnected for use in surveying the calls of other P. B. X exchanges; alternatively by the simple expedient of changing a few connections, the same equipment may be adapted to restrict calls made by the P. B. X subscribers to any exchanges the management desires to have in the restricted group as a result of the survey. If desired, the equipment may also be connected to provide a traffic record of the calls, and to simultaneously affect the restriction of calls to certain of the extended area exchanges.

These and other features of the invention will be better understood with reference to the specification, claims and drawings which appear hereinafter, in which:

Fig. 1 comprises a schematic block diagram illustrating the switching apparatus of the P. B. X surveying arrangement and the telephone system in which it is incorporated. This same block diagram may be considered as illustrating the surveying arrangement as used for trunk screening or as used for P. B. X trunk traffic study purposes.

Figs. 2–5 when arranged as shown in Fig. 6 comprise a schematic circuit diagram of the surveying, screening, and traffic study arrangements. It will be noted that optional wiring choices adapt the circuitry for either trunk screening or trunk traffic study, or both.

GENERAL DESCRIPTION

As shown in Fig. 1, a private branch exchange 110 is adapted to serve a number of subscriber substations, illustrated at 100 and includes means for effecting connections between subscribers of the private branch exchange, as well as over automatic city trunks 115 to the subscribers in associated city exchange 120. In the illustrated arrangement, levels 1–8 of the P. B. X exchange have been assigned for use by the substation in establishing calls to the subscribers local to the P. B. X exchange 110; level 9 have been assigned for use in obtaining access to automatic city trunks 115, and level 0 has been assigned for use in reaching the attendant 125.

After the attendant is reached by dialing the digit "0," a call may be extended by the attendant alternatively over a path, such as 127, to the attendant city trunks 130 associated with the city exchange 120; or over a path such as 128 to the automatic city trunks 115 which are also connected to the city exchange 120.

Calls incoming to the private branch exchange from parties in the city exchange 120 are extended over the attendant city trunks 130 to the attendant's position 125. The attendant in turn extends them over paths, such as 126, to the desired party.

As noted, the private branch exchange 110 extends connections to the city trunks with the dialing of the digit "9" and to certain predetermined exchanges of the metropolitan system by dialing the code number of the exchange followed by the number of the desired party. As for example:

City trunk seizing digit—9
Terminal called office designation—AX0
Called party number—2459

As shown in Figure 1, as the calling party dials the digit 9 an automatic city trunk circuit such as 115 is seized in the conventional manner. The trunk is operative with the receipt of the called office code to effect seizure of a link in the corresponding exchange, and the link and associated switching equipment in the exchange extends the call to the desired subscriber as the called party number is dialed.

Novel survey and restrictor equipment indicated at 135–160 is associated with the automatic city trunks 115 for the puropose of surveying trunk calls as they are made in this manner, and in accordance with the nature of the equipment included therewith is used for traffic study purposes, for screening of calls, or for both.

The associated survey and restrictor equipment 135–160 basically comprises a line circuit 135 for each trunk in the group of automatic city trunks 115, and an allotter circuit 140 accessible to the line circuits for the purpose of seizing an idle one of the line-finder-register circuits 145, 150 as a call is initiated over one of the trunks. The line-finder-register arrangements 145, 150 are afforded access to survey and common equipment 155 by a guard circuit 160.

If the arrangement is used for trunk screening, optional wiring is connected in the register circuit 150 to provide a restriction signal which is passed back to the trunk to operate a restriction relay in the blocking of the call. Alternatively, in response to the operation of the restriction relay the calling party is given busy tone or routed to an operator.

If the arrangement is used for traffic study, optional wiring in the register causes calls attempted over the associated trunk to be counted on two mesage registers, one of which counts the number of calls to exchanges which are being considered for restriction, and the other of which counts the number of calls to exchanges which are to be nonrestricted exchanges.

An arrangement for tapping into and modifying a P. B. X automatic city trunk circuit such as 115, is shown in Fig. 2. The trunk circuit 115 may be a conventional trunk circuit, which as schematically illustrated thereat may include a dial relay 200, hold relay 205, a restrictor relay 210, and an impedance coil 220.

Assuming first an arrangement which is to be used for traffic survey purposes, the line circuit for the trunk circuit is connected thereto by a tap made to the energizing circuit of the hold relay 205 in the trunk. No other trunk connection is required when the equipment is used for traffic study purposes.

A restriction relay 210 may be connected in the system by means of the B-wiring option (see Fig. 3) for the purpose of returning busy tone to the calling party or routing the call to the attendant whenever the call is extended to a restricted exchange. Optional wiring for equipment of a circuit to energize an attendant's call lamp is also indicated at G on Fig. 2.

The line circuit #1, designated as 135, associated with and connected to the first trunk 115, is also shown in Fig. 2. A vacuum tube signal circuit 225 is utilized as a transition stage for connecting the trunk circuit to the line circuit, the high impedance connection obviating any interference with the trunk as a result of the tap into the circuit of the trunk hold relay 205.

Each line circuit, such as line circuit 115, is associated with a trunk, such as #1. Thus line circuit #10, designated as 135', is shown associated with trunk #10. Each of the line circuits 1–10 comprise the following relays:

Relay 230—Line relay. Operates when the trunk is seized. Follows the dial pulses.
Relay 240—Line hold relay. Controls release.
Relay 235—Line cut-off relay. Operates when the line-finder finds the line.

It should be noted that the line circuits are multipled to all of a plurality of line-finder switches, only the first of which is shown and illustrated at 145. Thus line circuit #1 is shown connected to the #1 terminals of banks 265 and 270 of the line-finder switch 145; lines #2–#9 are connected to terminals #2–#9; and line #10 is shown connected to the #10 terminals of the same banks.

For illustration ten trunks and ten line circuits will be assumed, the number of line-finders and back-to-back registers being determined by traffic considerations.

Briefly stated, when a trunk, such as 115, is seized over the P. B. X switchboard by a calling subscriber, the associated line circuit 135 is seized and extends a start circuit to an idle line-finder switch, such as 145. The seized line-finder 145 then operates to find the calling line as more fully described hereinafter.

The register 150 as shown in Figs. 3–5 includes a four-bank homing numerical switch 395 (Fig. 3) which operates responsive to the first three digits of the called number and other circuitry. Terminals 1–10 in each of the four banks are assigned to the first digit; terminals 11–20 to the second; and terminals 21–30 to the third.

Following in chart form is a list of the line-finder-register relays and their functions including the allotter and guard relays:

315—Allotter relay; normally operated when register is idle.
305—Start relay; operates from "start" lead to start finder switch hunting.
310—Hunting stop relay; pulls in series with finder switch magnet when trunk is found.
320—Transfer relay; operates in series with dial switch magnet from dial pulses.
325—Auxiliary D relay.
400—Guard relay; controls engagement of common relays after first three digits have been dialed.
330—Pulls when common equipment has been engaged.
335—Non-restriction relay; operates if restricter indicates that call is not to be restricted.
500–530—Register for hundreds digit of called exchange code.
540–570—Register for tens digit of called exchange code.

Equipment common to the registers, such as 150, as shown in detail in Fig. 4, and as shown thereat, comprises guard, allotter, and survey equipment. Only a single common equipment set is shown, although a plurality of common equipment sets may be employed as shown in the aforesaid copending application.

The relays of this common equipment are indicated as follows:

Relay 420—Guard relay.
Relay 425—Reset relay.
Relays *430b–430j*—Survey relays for first digit of called exchange code.
Relays *435a–435j*—Survey relays for second digit of called exchange code.
Relay 450—Message register which counts restricted calls.
Relay 455—Message register which counts non-restricted calls.

An additional portion of the register 150 is shown in Fig. 5, and as there illustrated, comprises a first group of four relays 500–530 operated singly and in combination to store the first digit (hundreds) of the called exchange code, and a second group of four relays 540–570 operated singly and in combination to store the second digit of the called exchange code. The third digit (units) of the called exchange designation is stored on the terminals of the numerical switch 395 (terminals 21–30 of bank 345).

The setting of relay group 500–530 following receipt of the first digit determines a path through an associated fan of contacts to the operated one of the common survey hundreds relays *430b–430j*. Similarly, the setting of relay group 540–570 following receipt of the second digit determines a path through the associated fan of contacts to operate one of the common tens survey relays *435a–435j*.

It is apparent therefrom that the first three digits of the called exchange code are utilized to automatically set up survey circuits in a register, such as 150, which in turn will restrict, extend or register for information purposes, the call which is being attempted. The specific nature of the register operation is, of course, determined by the manner in which the equipment is connected at the time of installation. Detailed consderation will now be given to the operation of the system in the extension of an exemplary call which is attempted by a P. B. X subscriber to a subscriber in an extended exchange area.

DETAILED DESCRIPTION

The calling P. B. X party, such as 100, in making a call to a called party in the associated city exchange, or to a party in a distant exchange accessed through the local associated city exchange, dials a series of digits comprising the automatic city trunk digit and the called number. For example:

| Automatic City Trunk Digit | Terminal Called Exchange Designation | Called Party Number |
|---|---|---|
| 9 | AX0 | 2459 |

The terminal called exchange designation AX0 is equivalent to 290 as can be appreciated by reference to a metropolitan dial.

Figure 1:
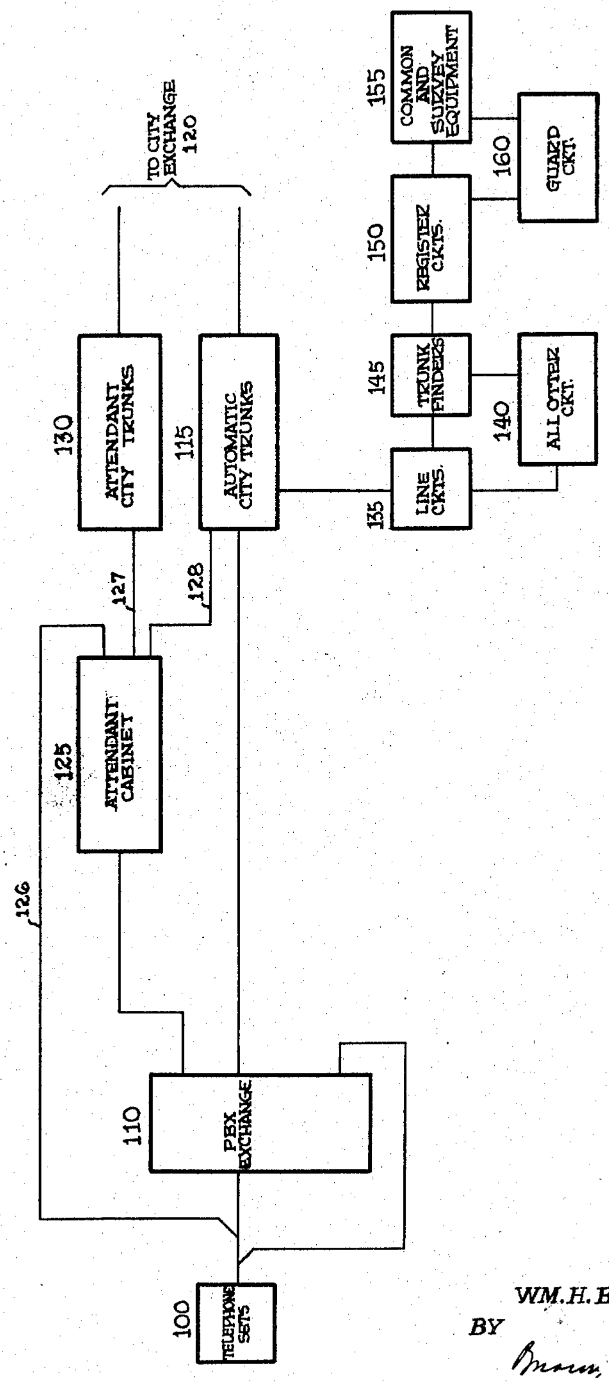
Figure 2:
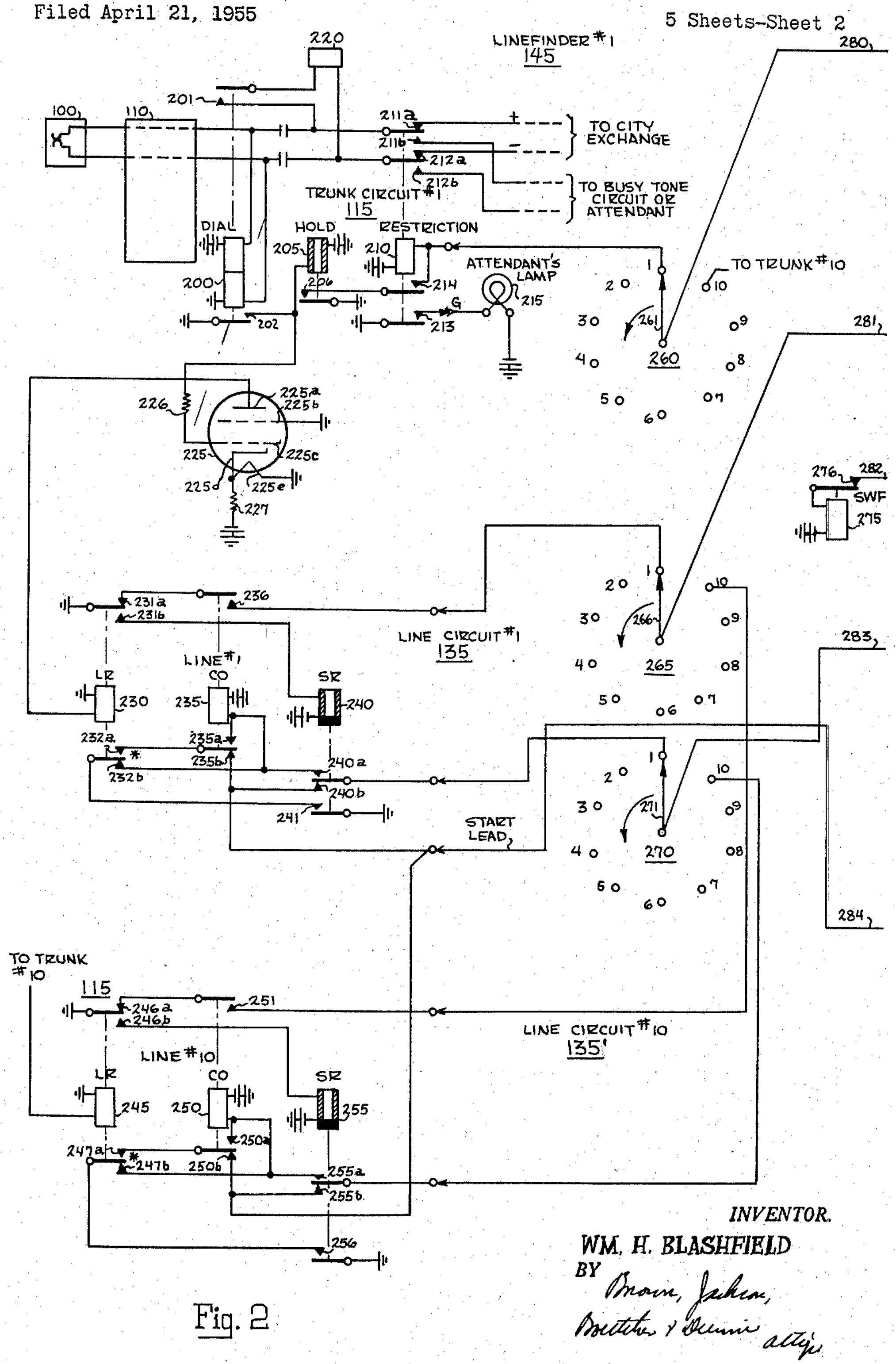
Figure 3:
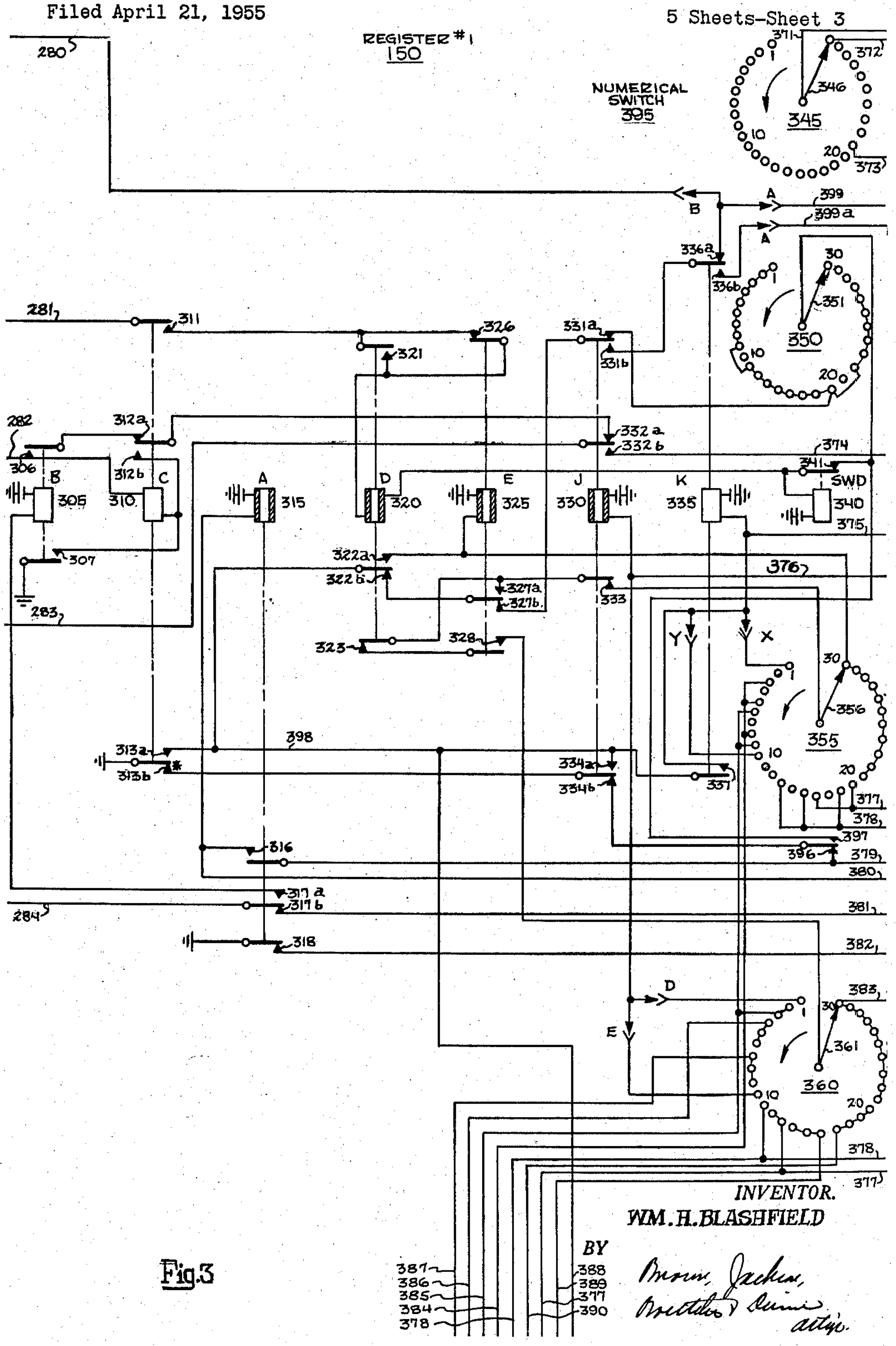
Figure 4:
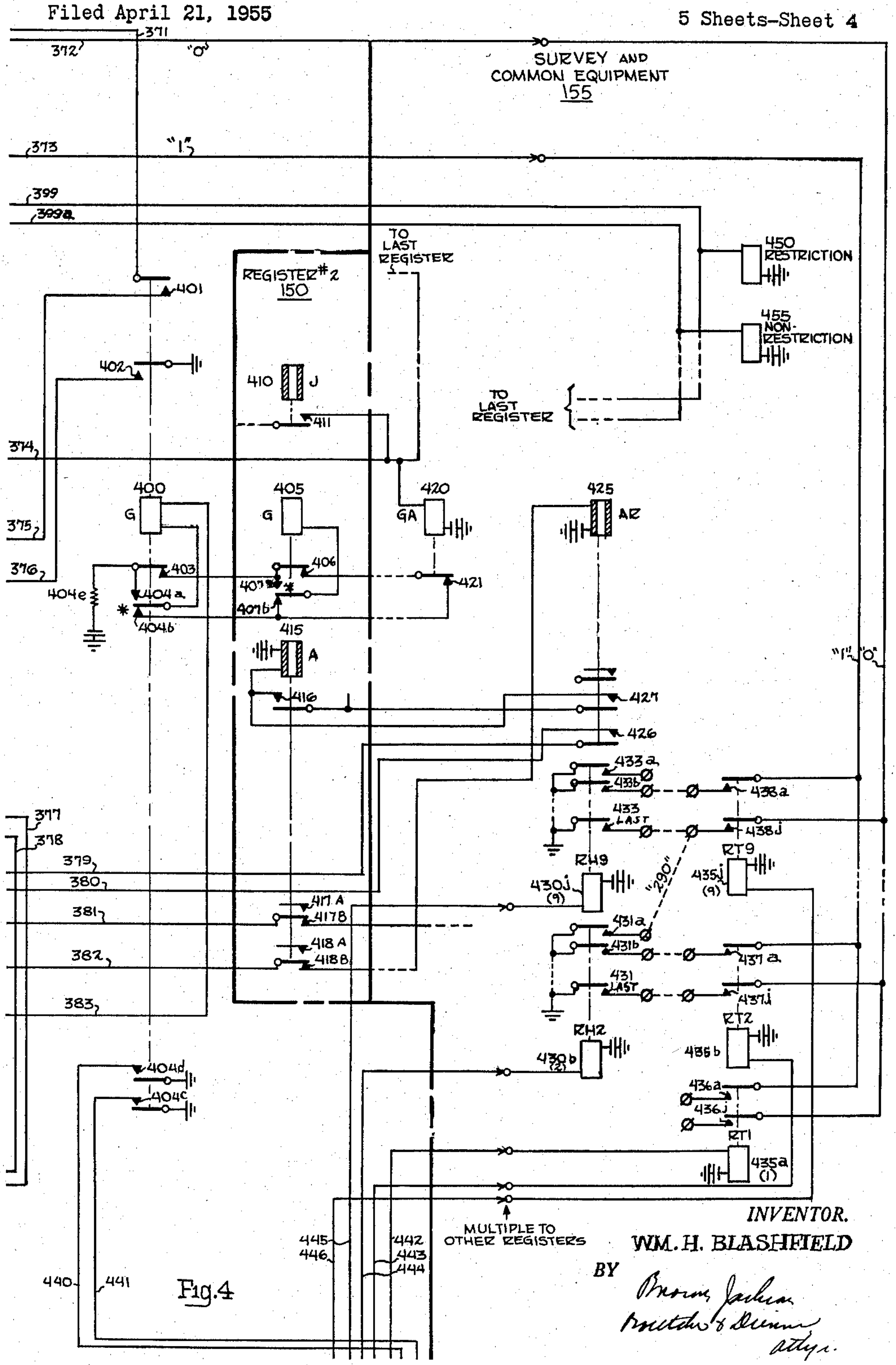
Figure 5:
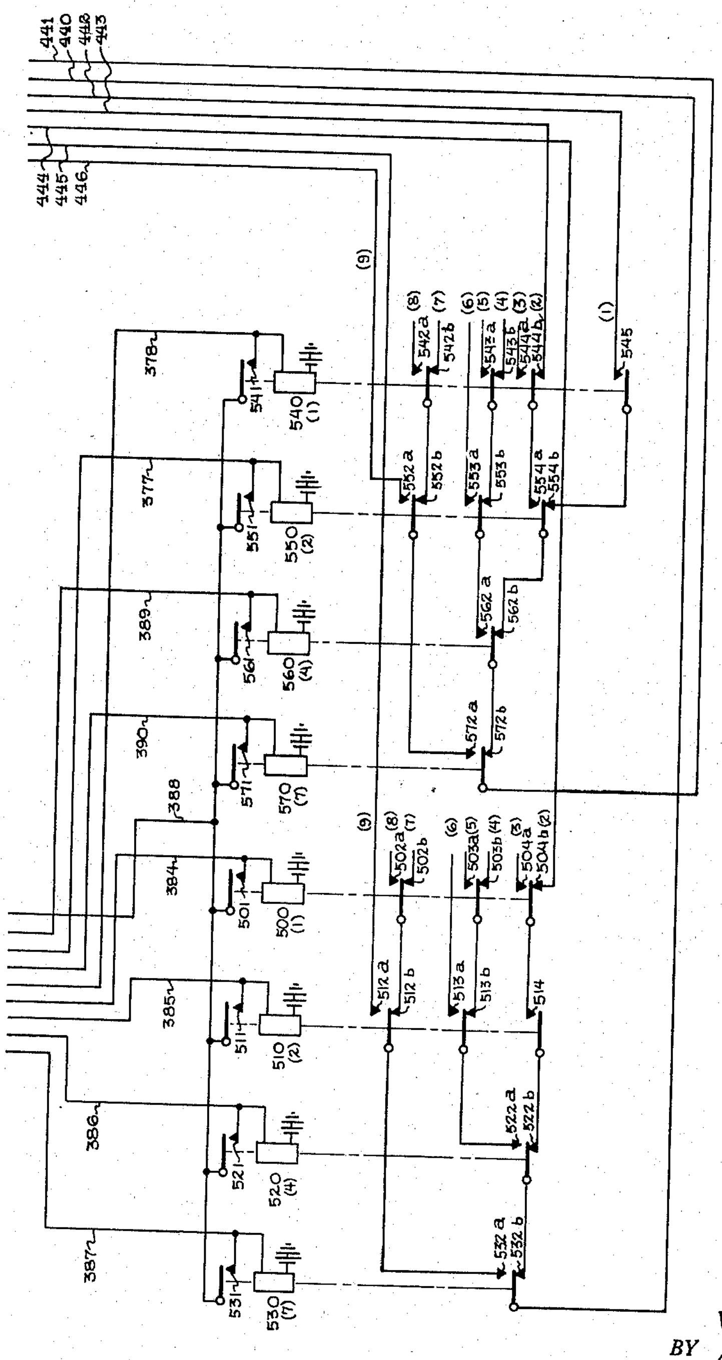
Figure 6:
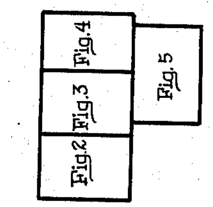

Assuming now that one of the calling P. B. X parties indicated at 100 in Figs. 1 and 2 lifts the handset from his associated subset, a loop is extended in the conventional manner from his telephone set to the P. B. X exchange 110. The calling party then dials the trunk digit, called exchange designators, and the called party number to effect extension of the call to a subscriber in an extended area exchange which is accessed through the local associated city exchange.

TRUNK ACCESS CODE "9" DIALLED

When the trunk access code 9 is dialled to make connection with an idle P. B. X automatic city trunk, the calling loop is extended over selector level "9" in the P. B. X exchange 110 in the conventional manner and into the trunk circuit 115. A loop circuit is thereupon closed to the trunk dial relay 200, the circuit extending from positive battery over the upper winding of relay 200, the positive conductor to the P. B. X exchange, over the positive conductor to the closed contacts in the calling party substation set, the closed contacts in the substation set, the negative conductor extending to the P. B. X exchange, and over the P. B. X exchange to the negative conductor and the lower winding of the dial relay 200 to negative battery.

The trunk dial relay 200 operates, and at its contacts 202 closes an obvious circuit to the trunk hold relay 205, which is of the slow-to-release type, and therefore holds during pulsing of the trunk dial relay; and at its contacts 201 closes a loop to the city exchange, landing the call in the city exchange, the loop thus closed extending from the city exchange trunk positive wire, over contacts **211*a*, contacts 201, impedance coil 220, and contacts 212*a* to the trunk negative wire. Trunk dial relay 200 at its contacts 202 also connects ground over resistor 226 to the control grid 225*c* of tube 225**, which may be of the 50C5 type.

It should be observed that the plate-cathode circuit of the tube 225 is connected to battery in series with the line relay 230 of the line circuit associated with the seized trunk circuit (line circuit 135 and associated trunk circuit 115 in the present example); the screen grid **225*b* of tube 225 is connected to ground, and the indirectly heated cathode 225*d* is connected over resistor 227 to battery whereby the cathode is normally positive with respect to the control grid 225*c* which is connected to negative battery through the winding of the trunk hold relay 205. Thus the tube 225 is normally nonconducting. However, as the dial relay 200 operates and at its contacts 202 connects ground (positive battery) to the control grid 225*c*, the anode-cathode path of the tube 225 conducts sufficiently to operate line relay 230**.

Line relay 230 operates, and at its contacts **231*b* closes an obvious circuit to energize line hold relay 240; and at its contacts 232*a*** prepares a point in the finding circuit for the linefinder-register equipment.

Line hold relay 240 operates and at its contacts **240*a* connects line cut-off relay 235 to terminal # 1 of bank 270 of the linefinder switch 145; and at its contacts 241 completes the start circuit for the linefinder-register equipment over the following path: ground, contacts 241, contacts 232*a*, contacts 235*b* to the start lead 284**, which is multipled to each of the line circuits.

Assuming that linefinder-register #1 is preselected for seizure, allotter relay 315 therein will be found operated and locked over the following circuit: battery, winding of relay 315, contacts 316, off-normal break contacts 396 of the numerical switch 395, contacts **334*b* and 313*b*** to ground.

It should be noted that each linefinder-register 145–150 contains an allotter relay, such as 315, and that when all allotter relays, such as 315, have released as a result of all registers having been used, reset relay 425 is energized over a circuit extending from ground over contacts 318 in register #1, the corresponding contacts in series of each relay, such as 415, in the various registers, and over the winding of common reset relay 425 to battery.

Reset relay 425 operates and at its contacts 426, 427, etc., closes a point in the operating circuit of each allotter relay, such as 315. Accordingly the relay, such as 315, in each idle linefinder-register operates and locks, and releases relay 425. The operating circuit for relay 315 of linefinder-register #1 for example, extends from battery, over the winding of relay 315, C380, contacts 426, C379, off-normal break contacts 396, contacts **334*b*, and 313*b*** to ground.

Assuming that the allotter has thus prepared the linefinder-register circuits in this manner, and that relay 315 of linefinder-register #1 is therefore operated and locked, with the seizure of a line circuit, such as 135, by its associated trunk as a call is initiated thereover, ground is placed on the start lead 284 by the seized one of the line circuits, and extended over contacts **317*a* and the winding of start relay 305** to battery.

This same ground is extended back through each of the other line circuits to its associated terminal of bank 270 of the line-finder switch 145. For illustration, the circuit to terminal #10 of bank 270 is as follows: ground, contacts 241 in line circuit #1 (designated as 135), contacts **232*a*, 235*b*, start multiple to which start lead 284 is connected, contacts 255*b* in line circuit #10 (designated 135') to terminal #10 of bank 270**.

Accordingly, battery is connected over cut-off relay 235 to terminal #1 of bank 270 corresponding to the calling line circuit (and trunk), and ground is connected to terminals #2–#10 corresponding to all other line circuits (and trunks). More generally stated, the terminal on switch 270 which corresponds to the calling trunk is marked with battery; the other terminals on the switch 270 are marked with ground.

Relay 305 operates, and at its contacts 307 connects ground to one side of the winding of hunting stop relay 310; and at contacts 306 closes a circuit to connect switch drive magnet 275 to the wiper 271 of bank 265, and at its contacts 307 completes a series circuit for high resistance relay 310 and stepping magnet 275. Stepping magnet 275 will not operate over this circuit, however, because of the high resistance of relay 310.

Remembering that the linefinder switch is of the nonhoming type, and assuming that the wipers rest on terminals #8 from the prior call, switch drive magnet 275 energizes over a circuit extending from battery, over the winding of switch magnet 275, contacts 276, conductor 282, contacts 306, 312*a*, 332*a*, conductor 283, wiper 271 and terminal #8 of bank 270, break contacts 240*b* in line circuit #8 (not shown, but the same as 240*b* of illustrated circuit 135), the start wire multiple, contacts 235*b* in line circuit #1 (designated 135), contacts 232*a*, and 241 to ground. Since relay 310 has ground connected to both sides of its winding, it will not operate at this time.

Switch magnet 275 operates, and opens its contacts 276 to thereby interrupt its own energizing circuit. As a result switch magnet 275 restores, stepping the switch to terminals #9, and at its contacts 276 reestablishes a portion of its operating circuit. Switch magnet 275 re-energizes through a similar circuit which extends over terminal #9 of switch bank 270, line circuit #9, and the start multiple to the contact ground in line circuit #1.

Switch magnet 275 operates and at its contacts 276 opens its own circuit. As switch magnet 275 restores, it steps the switch to terminal #10, and at its contacts 276 closes a portion of its own energizing circuit. In that switch magnet #10 is also marked with ground, switch magnet 275 operates over a circuit such as described relative to terminals #8 and #9, and at its contacts 276 interrupts its own circuit to restore itself.

The switch wiper is thereby stepped to terminal #1. As noted above terminal #1 is now marked with battery, and an operating circuit for the high resistance hunting stop relay 310 is completed thereover, the circuit extending from ground over contacts 307, the winding of relay 310 to battery over two paths, one of which extends over contacts 276 and the winding of magnet 275 to battery; and the other of which extends over contacts 306, 312*a*, 332*a*, conductor 283, wiper 271 and terminal #1, contacts 240*a* and the winding of relay 235 to battery. The high resistance of relay 310 prevents line cut-off relay 235 and the magnet 275 from operating at this time.

Relay 310 operates and at its contacts 311 prepares a circuit for relay 320, at its contacts 313*b* opens the holding circuit of allotter relay 315, and at its contacts 312*a*, 312*b* transfers the circuit of line cut-off relay 235 from its parallel relationship with switch magnet 275 to direct ground. Line cut-off relay 235 operates, and at its contacts 235*a* locks to a circuit which extends over contacts 235*a*, 232*a*, and 241 to ground; and at contacts 235*b* disconnects its ground circuit from the start lead 284 releasing relay 305 if no other call is causing its line circuit to place ground on the start lead. As relay 305 restores, the switch magnet 275 and relay 310 are held by ground which is extended over contacts 241, 232*a*, 235*a*, 240*a*, terminal #1 and wiper 271 of bank 270, conductor 283, and contacts 332*a*, and 312*b* to hold relay 310 in series with the winding of switch magnet 275 and holding relay 310. If other line circuits have placed ground on the start lead 284, relay 305 is not released until allotter relay 315 subsequently releases. It should also be observed that the high resistance of relay 310 prevents switch magnet 275 from operating.

After an interval as determined by its slow to release characteristics, sleeved relay 315 restores and at its contacts 317*a* opens a point in the circuit of relay 305. As noted, if other calls are waiting, relay 305 of line finder register 150 has been held until this time.

Relay 315 in releasing extends the start lead circuit to the lever associated with contacts similar to 317*a* and 317*b* in register #2. Accordingly the next call will operate the allotter relay 415 in register #2 (which is similar to relay 315 in register #1) if relay 415 is operated in register #2. If the allotter relay 415 in register #2 is not operated, the start wire will be extended to register #3. The following operation of the allotting arrangement for the linefinder register circuits is believed to be apparent from the foregoing disclosure.

It is noted that if a calling subscriber should start to dial before the line is found, the line relay 230 will follow the pulses and as it restores responsive to occurrence of the first break impulse, it is effective at its contacts 232*b* to complete an energizing circuit for the cut-off relay 235 which operates to prevent selection of the line by the linefinder after the dialling has been initiated.

EXCHANGE DIGIT "2" DIALLED

At this time, the P. B. X. calling party has dialled the trunk digit "9" to seize a trunk circuit, such as 115, which operated to land the call in the associated city exchange, and to seize a linefinder register circuit over its associated line circuit (register #1 for example, shown in Figs. 2–5).

The calling party now dials the first digit "A" of the called exchange designation "AX0." Since the called exchange designation AX0 corresponds to digits 290, the calling dial will open and reclose the calling loop twice responsive to the dialling of the letter "A."

The first opening of the calling loop interrupts the circuit for the trunk dial relay 200 which restores and at its contacts 202 removes ground from the trunk hold relay 205, and also from the control grid 225*c* of tube 225 in its associated line circuit 135. The trunk hold relay 205 is sleeved and accordingly does not release during dialling. The removal of ground from the control grid 225*c* of tube 225 renders the tube sufficiently nonconductive to restore line relay 230. Relay 200, at its contacts 201, also transmits this dial pulse and all succeeding pulses to the city exchange.

Line relay 230 restores and at its contacts 231*b* opens the circuit of sleeved and slugged relay 240 which does not release during dialling; at its make-before-break contacts 232*a* extends ground to relay 235; and further extends ground over contacts 240*a* to terminal #1 of bank 270 to hold relay 310 operated; at its contacts 231*a* completes an operating circuit for register transfer relay 320 in series with numerical switch control magnet 340, which circuit extends from battery, over the winding of magnet 340, the winding of relay 320, contacts 326, 311, C281, wiper 266 and contacts #1 of bank 265, contacts 236 and 231*a* to ground.

Transfer relay 320 operates, and at its contacts 322*a* completes a circuit to its auxiliary relay 325, which circuit extends from battery over the winding of relay 325, contacts 332*a*, and 313*a* to ground. Magnet 340 operates and prepares to step the associated switch 395.

When the calling dial recloses the calling loop following termination of the first break period, trunk dial relay 200 reoperates, and at its contacts 202 completes the circuit for trunk hold relay 205, and additionally connects ground to the control electrode 225*c* of tube 225.

Tube 225 is rendered sufficiently conductive to operate line relay 230, which in turn is effective at its contacts 232*a*, to reconnect ground to relaiy 235, the ground specifically extending over contacts 241, 232*a*, and 235*a* to the winding of relay 235 and battery. This same ground is also extended over contacts 240*a*, terminal #1, wiper 271, C283, contacts 332*a* and 312*b* to relays 310 and 275 in series and to battery. Line relay 230 at its contacts 231*a* opens the series operating circuit for relay 320 and step magnet 340; and at its contacts 231*b* recompletes the circuit to relay 240 which has remained in the operative condition during pulsing by reason of its slow to release characteristics.

Switch magnet 340 releases, advancing the switch wipers 346, 351, 356, and 361 to terminals #1 in the banks 345, 350, 355, and 360 respectively. Off-normal contacts 396 open and 397 close. Relay 320 being of the sleeved type is slow to release and does not release during the receipt of the impulse set which represents a digit.

The next opening of the calling loop by the calling dial similarly causes line relay 230 to release in the manner above described to thereby effect reoperation of relay 320 in series with magnet 340. Magnet 340 reoperates, preparing the numerical switch 395 to advance its wipers to terminals #2.

The subsequent reclosing of the calling loop effects reoperation of the line relay 230 as above described, and reopening of the series circuit of relay 320 and switch magnet 340. Switch magnet 340 releases, stepping the wipers of the associated switch to terminals #2 in the respective banks 345, 350, 355 and 360. The extended closure of the control loop by the calling subscriber between digits holds the line relay 230 operated for a period sufficient to effect the release of relay 320, which in turn is effective at its contacts **322*a* to open the circuit of associated relay 325**, which releases a subsequent interval thereafter as determined by its slow-to-release characteristics.

During the interval between the release of relays 320 and 325, a circuit is completed for the particular one or group of register relays which have been assigned to mark the value of the received hundreds digit on the register (see Table I). In the present example, the hundreds digit is "2," and accordingly the register relay 510 is operated over a circuit which extends from battery over the winding of relay 510, conductor 385, terminals 2 and 3 and wiper 361 of bank 360, contacts 328, 323, **327*a* 322*b*, and 313*a* to ground. Relay 510 operates, and at its contacts 511 locks to ground over a circuit extending from battery, over the winding of relay 510, contacts 511, conductor 388 and contacts 313*a*** to ground.

As relay 325 subsequently releases, it is effective at its contacts **327*b* to complete a self-interrupting circuit for the numerical switch 395 to run same up to terminal 10, the self-interrupting circuit for switch drive magnet 340 extending from battery over the winding of switch drive magnet 340, contacts 341, wiper 351, the strapped terminals of bank 350, contacts 331*a*, 327*b*, 322*b*, and 313*a*** to ground.

The switch magnet 340 operates, and at its contacts 341 opens its energizing circuit to restore itself and advance the switch one step. As switch magnet 340 restores, it is effective at its contacts 341 to recomplete its operating circuit, and to effect the reoperation thereof. This cycle continues, the step magnet 340 stepping the switch each time it restores. The associated switch wipers 346, 351, 356, and 361 are driven in this manner until terminal 10 is reached, whereupon the driving circuit for the magnet is opened and the switch comes to rest.

Before taking up the description of operation of the equipment responsive to dialling of the next digit (the tens digit of the called exchange code) the nature of the operation of the equipment responsive to receipt of various other hundreds digits of the called exchange designation code will be illustrated.

Briefly, in the following table the left hand column indicates the various hundreds digits dialled; the center column indicates the corresponding register relays operated (survey relays **430*c*–430*h*** are not shown in the drawings), and the right hand column indicates the corresponding common survey relays operated.

*Table I*

| Hundreds Digit | Register Relays | Survey Relays |
|---|---|---|
| 2 | 510 | 430*b* |
| 3 | 500, 510 | 430*c* |
| 4 | 520 | 430*d* |
| 5 | 500, 520 | 430*e* |
| 6 | 510, 520 | 430*f* |
| 7 | 530 | 430*g* |
| 8 | 500, 530 | 430*h* |
| 9 | 510, 530 | 430*j* |

It is noted by way of review that during the interval between the release of relay 320 and the release of relay 325 following receipt of the last pulse of the hundreds digit, ground is connected to the wipers 361 and 356 of the banks 360 and 355. The circuit to wiper 361 was described in connection with the operation of relay 510, and as there taught, extended from ground, over contacts **313*a*, 322*b*, 327*a*, 323, 328, and wiper 361 of bank 360. The circuit for wiper 356 extends from ground over contacts 313*a*, 322*b*, 327*a*, and 333 to wiper 356 of bank 355**.

Register relay 500 is connected to terminals 3, 5, and 8 of bank 355 over conductor 384, and operates whenever one of the terminals 3, 5 or 8 of bank 355 is selected.

Register relay 510 is connected to terminals 2 and 3 of bank 360 and terminals 6 and 9 of bank 355 over conductor 385, and operates whenever one of the terminals 2, 3, 6 or 9 is selected.

Register relay 520 is connected over conductor 386 to terminals 4, 5, and 6 of bank 360 and is operated whenever one of the terminals 4, 5, 6 is selected.

Register relay 530 is connected over conductor 387 to terminals 7, 8, and 9 of bank 360 and is operated whenever one of the terminals 7, 8 or 9 is selected.

It is apparent from the foregoing description that relays 500, 510, 520 and 530 are used singly, and in various combinations, to mark the value of the hundreds digit of the called exchange code as transmitted by the calling party in the extension of a call over the seized trunk circuit.

EXCHANGE DIGIT "9" DIALLED

As the calling party now dials the second digit "X" of the called exchange designator "AX0" (290), the calling loop is opened and closed nine times.

As the first break period of the first impulse is received, the trunk dial relay 200 restores, and at its contacts 202 removes ground from the control electrode **225*c* of tube 225, causing the tube to become decreasingly conductive, and to thereby restore line relay 230**.

Line relay 230 releases, and at its contacts **231*a* recompletes the circuit traced hereinbefore for the switch magnet 340 in series with register transfer relay 320. Switch magnet 340 operates, preparing the switch 395 for stepping. Relay 320 reoperates and at its contacts 322*a* recompletes the operating circuit for relay 325**.

The subsequent reclosure of the calling line loop recompletes the energizing circuit for trunk dial relay 200, which operates, and at its contacts 202 renders the tube 225 sufficiently conductive to energize line relay 230. As line relay 230 operates, it is effective at contacts **231*a* to interrupt the circuit for switch magnet 340 which restores, and causes the manual switch 395 to advance its wipers to terminals #11. The subsequent opening and reclosing of the calling line loop responsive to the incoming impulses for the tens digit "9" results in the advancement of the numerical switch 395** to terminals #19.

An interval after the pulsing of the digit 9 has ceased, dial relay 200 is held energized; tube 225 conducts; and line relay 230 is held energized, for a period corresponding to the period between the dialling of the digits of the code. Line relay 230 at its contacts **231*a* interrupts the circuit for relay 320 for a time period sufficient to permit slow to release relay 320 to restore. Relay 320 restores and at its contacts 322*a* in turn interrupts the circuit for relay 325** which releases after the elapse of an interval, determined by its release characteristics.

During the interval between the release of relay 320 and the release of relay 325, circuits are completed to operate the particular register relays of the group 540–570 which have been assigned to register the value of the "tens" digit received. In the present example, the tens digit is "9," and reference to Table II below indicates register relays 550 and 570 are used to mark with the receipt of such digit.

More specifically, with the wipers of manual switch 395 resting on terminals 19, a circuit is completed for register relays 550 and 570; the circuit for relay 550 extends from battery over the winding of relay 550, C377, terminal 19, and wiper 356, of bank 355, contacts 333, 327*a*, 322*b*, and 313*a* to ground. Register relay 570 is operated over a circuit extending from battery over the winding of relay 570, C390, terminals 17, 18, 19 and 20, wiper 361 of bank 360, contacts 328, 323, 327*a*, 322*b* and 313*a* to ground.

Register relays 550 and 570 operate and at their contacts 551 and 571 respectively lock over an obvious circuit extending over lead 388 and contacts 313*a* to ground.

The following table indicates in the left hand column the various tens digits dialled; in the center column indicates the corresponding register relays operated; and in the right hand column indicates the corresponding common survey relays later operated (survey relays 435*c*—435*h* are not shown in the drawings).

*Table II*

| Tens Digit | Register Relays | Survey Relays |
|---|---|---|
| 1 | 540 | 435*a* |
| 2 | 550 | 435*b* |
| 3 | 540, 550 | 435*c* |
| 4 | 560 | 435*d* |
| 5 | 540, 560 | 435*e* |
| 6 | 550, 560 | 435*f* |
| 7 | 570 | 435*g* |
| 8 | 540, 570 | 435*h* |
| 9 | 550, 570 | 435*j* |

The manner in which the proper register relays 540–570 are energized at the completion of pulsing of the tens digit to effect the above markings will be apparent from the following description. Briefly, during the interval between the release of relay 320 and the release of relay 325, ground will be found connected to the wipers 361 and 356 of banks 360 and 355 respectively, and these grounds are extended to the tens register relays 540 to 570 singly and in the combinations indicated according to the digit dialled.

Thus, relay 540 is connected over conductor 378 to terminal 11 of bank 360 and to terminals 13, 15 and 18 of bank 355.

Relay 550 is connected over conductor 377 to terminals 12 and 13 of bank 360, and to terminals 16 and 19 of bank 355.

Relay 560 is connected over conductor 389 to terminals 14, 15 and 16 of bank 360.

Relay 570 is connected over conductor 390 to terminals 17, 18, 19 and 20 of bank 360.

Continuing now with the description of the specific call, it is recalled that the numerical switch 395 was standing on terminals 19 as the last impulse of the tens digit (9 in the present example) was received, and that the proper register relays were operated during the interval occurring between the release of relay 320 and relay 325.

As relay 325 now releases, it is effective at its contacts 327*b* to complete a self-interrupting circuit for switch magnet 340 in order that the numerical switch 395 may be driven to terminal 20 (which is the assigned resting point for the numerical switch wipers prior to dialling of the third digit). The advancing circuit for the switch magnet 340 extends from battery over the winding of magnet 340, contacts 341, wiper 351 and terminal 19 of bank 350, and contacts 331*a*, 327*b*, 322*b* and 313*a* to ground.

Step magnet 340 operates and prepares the switch to step, and at its contacts 341 interrupts its energizing circuit. Accordingly magnet 340 releases, advancing the wipers of the numerical switch 395 to terminal 20. In that no further energizing circuit for magnet 340 is found on terminal 20 of bank 350, the switch now comes to rest on this terminal.

EXCHANGE DIGIT "0" DIALED

As the calling party dials the third or units digit "0" of the called exchange designation AX0 (290), the calling loop is opened and closed ten times.

As previously described, the trunk dial relay 200 follows the dial pulses, and pulses line relay 230 through the medium of tube 225. Line relay 230 at its contacts 231*a* pulses step magnet 340 in series with transfer relay 320, the transfer relay being connected to operate on the first pulse and to remain operated during receipt of the pulses representing the digit. The pulsing of the switch magnet 340 ten times advances the numerical switch 395 to terminals 30 in a manner which is obvious from the discussion of the switch operations responsive to receipt of the hundreds and tens digits.

After the cessation of pulsing, dial relay 200 is held operated, and therefore tube 225 holds the line relay 230 operated in the manner described hereinbefore. Line relay 230 at its contacts 231*a* holds open the circuit for relay 320 a time period sufficient to permit the release thereof. Relay 320 restores and at its contacts 322*a* interrupts the circuit for relay 325.

Following the conclusion of pulsing of the third or units digit of the called exchange code, however, relay 325 is not released immediately in the manner of the release effected following receipt of the hundreds and tens digits. Specifically at this time another energizing circuit is completed for relay 325, the circuit extending from battery over the winding of relay 325, terminal 30 and wiper 356 of bank 355, contacts 333, 327*a*, 322*b* and 313*a* to ground. It should be observed that terminals 21–30 are multipled together, and in the event that switch 395 has been stopped on some third digit terminal other than 30 as a result of the dialing of a digit other than "0," the holding circuit for relay 325 would nevertheless have been completed.

Relay 325 at its contacts 326 holds open the circuit for energizing magnet 340 in series with relay 320, so that any subsequent pulsing of line relay 230 cannot effect the advancement of the numerical switch 395; and at its contacts 327*b* postpones the running of the switch 395 to the rest point 30 (in calls in which the switch is stopped on some terminal before 30 as a result of a third digit other than "0" having been dialed).

With relay 320 released, and relay 325 operated, a circuit is completed to operate guard relay 400 associated with line finder-register #1, which circuit extends from ground over contacts 313*a*, 322*b*, 327*a*, 323, 328, wiper 361, the multipled terminals 21–30 of bank 360, conductor 383, the winding of guard relay 400, contacts 404*b* and 421, contacts, such as 406 and 403, of all guard relays associated with the registers, and over resistor 404*e* to battery.

Guard relay 400 operates, and at its make-before-break contacts 404*a* locks over resistor 404*e* to battery; and at contacts 403 holds open the operating circuit of all the guard relays such as 405 associated with other registers so that only one register can use the common survey relays at a time. Each guard relay such as 400 and 405, at its contacts, such as 403, 406, opens the locking circuits of the guard relays, such as 405, associated with higher numbered registers so that if two or more guard relays are energized at precisely the same instant, and operated, the guard relay associated with the lowest numbered register would remain operated, releasing the guard relays of higher numbered registers by opening their operating and holding circuits. The other registers would then wait in line to use the common survey relays.

Relay 400 at its contacts 401 prepares a circuit for allowance or non-restriction relay 335, which circuit extends from battery over the winding of relay 335, C375, contacts 401, C371, wiper 346 and terminal 30 of bank 345 to the "0" lead C372 (the units digit being "0" in the present example) which is connected to the lever associated with the tenth set of contacts of each of the second digit survey set of relays 435*a*–435*j*.

Relay 400 at its contacts 404*d* completes an energizing circuit for the one of the first group of survey relays in accordance with the value of the hundreds digit registered on the register relays 500–530. In the present example the hundreds digit is "2" and register relay 510 is operated. Accordingly the second survey relay 430b is now operated, the circuit extending from ground over contacts 404d, C440, contacts 532b, 522b, 514, 504b, C444, and the winding of relay 430b to battery.

Relay 400 at its contacts 404c also completes an energizing circuit for the survey relays of the tens group as indicated by the value of the tens digit on the register relay group 540–570. In the present example the tens digit is "9" and relays 550 and 570 have been operated. Accordingly the ninth survey relay 435j is now operated, the circuit extending from ground over contacts 404c, C440, contacts 572a, 552a, conductor 446 and the winding of relay 435j to battery.

Additionally, relay 400 at its contacts 402 completes a circuit for relay 330, the circuit extending from negative battery over the winding of relay 330, C376 and contacts 402 to ground.

Relay 330 operates, and at its contacts 331a interrupts a point in the circuit extending over bank 350; at contacts 332a interrupts the energizing circuit for relay 310 to restore same; at its contacts 333 interrupts the connection of ground to the wiper 356 of bank 355 thus opening the holding circuit for relay 325; at its contacts 334a prepares a holding circuit for relay 335; at contacts 334b holds open the self-interrupting circuit for magnet 340; and at contacts 332b completes an energizing circuit for relay 420, the circuit extending from battery over the winding of relay 420, conductor 374, contacts 332b, conductor 283, wiper 271 and terminal 1 of line-finder switch bank 270, contacts 240a, 235a, 232a and 241 to ground. Relay 420 operates, and at its contacts 421 opens the guard circuit until the register has completed its survey operation.

It is noted at this time that those exchanges which are to be accessible to the calling subscriber of the circuit exchange are strapped in the register to indicate their accessibility. That is assuming that the exchange designation AX0 (290), which has been dialed in the present example, is an exchange to which the calling P. B. X party is to be given access, contacts 431a of relay 430b (the hundreds survey relay) will be connected to contacts 438j of relay 435j (the tens survey relay) by a jumper or cross connect lead labeled "290" between the associated terminals.

Accordingly, with the register survey relays 430b and 435j operated, and the numerical switch 395 stopped on terminal 30, ground is extended over contacts 431a and the associated terminal, the jumper labeled "290" to the connecting terminal and associated contacts 438j, conductor 372 (the "0" lead), terminal 30 and wiper 346 of bank 345, C371, contacts 401, C375 and the winding of allowance or non-restriction relay 335 to battery.

Allowance relay 335 operates, and at its contacts 337 extends a self-holding circuit over contacts 313a to ground, and at its contacts 336b prepares a circuit to message register 455 which counts non-restricted calls.

Relay 325 restores, and at its contacts 328 interrupts the holding circuit for relay 400, and at its contacts 327b completes an energizing circuit for message register relay 455, the circuit extending from ground over contacts 313b, 334a, 322b, 327b, 331b, 336b, wiring option A, conductor 399a, and message register 455 to battery.

Relay 400 restores, and at its contacts 402 opens the circuit of slow-to-release relay 330; and at its contacts 404d and 404c respectively releases the operated ones of the survey relays 430b and 435j.

After an interval as determined by its slow release characteristics, relay 330 restores, and at its contacts 332b opens the energizing circuit for common guard relay 420. With relays 400 and 420 released, the guard circuit is available for use in the connection of another register with the common equipment.

Relay 330 at its contacts 334a also releases relays 335, 510, 550 and 570; at its contacts 334a and 331b disconnects ground from the message register 455; at its contacts 333 prepares the circuit of wiper 356 of bank 355; at its contacts 332a prepares the circuit of line-finder switch magnet 275; and at its contacts 334b completes an energizing circuit for switch magnet 340 (if the switch is not on terminal 30 as the result of the dialing of a units digit other than "0"), the circuit extending from ground over contacts 313b, 334b, the numerical switch off-normal make contacts 397, interrupting contacts 341 of switch magnet 340, and winding of switch magnet 340 to battery. If the switch is not standing on the final terminal 30 (as evidenced by the off-normal contacts remaining operated), the switch magnet 340 pulses to drive the switch 395 to terminal 30, at which point the off-normal contacts transfer from the closed make to the closed break condition to stop the switch.

When the off-normal break contacts close, allotter relay 315 is eligible for reset upon the next operation of common reset relay 425 as previously described.

The register and common equipment is thus returned to normal.

It should be observed that when ground is disconnected from the message register 455, the message register advances its count to provide an indication that a call to an "allowed" or non-restricted exchange has been made.

Furthermore it should be noted that if it had been desired to consider the exchange represented by the exchange designation AX0 (290) as a "disallowed" or restricted exchange, the strapping between the terminals associated with contacts 431a and 438j would not have been connected. In such event, relay 335 would not have operated, and as relay 325 subsequently restored, a circuit would have been completed for the message register 450, such circuit extending from ground over contacts 313b, 334a, 322b, 327b, 331b, 336a, A-wiring option, lead 399, and the winding of restriction message register 450 to battery.

As relay 330 restores as above described, it is effective at its contacts 331b to interrupt the holding circuit for message register 450, which restores and advances the count one to indicate that a call has been made to a "disallowed" or restricted exchange.

CALLED PARTY NUMBER DIALED

As the called party number in the terminal exchange is dialed, the pulses are extended over the line loop to the trunk dial relay 200.

The trunk dial relay 200 follows the pulses and at its contacts 201 repeats the pulses over the outgoing loop to the city exchange to set up a connection to the called party and to ring same.

The trunk dial relay 200 at its contacts 202 also effects the pulsing of the associated line relay 230 via tube 225 in the manner described heretofore. Relay 230 at its make-before-break contacts 232a and 232b maintains line cut-off relay 235 operated, and at its contacts 231b holds release control relay 240 operated.

Relay 235 in its operated condition is effective at its contacts 235b, and relay 240 is effective at its contacts 240b, to hold interrupted the connections from line circuit #1 to the start lead. Relay 230 at its make-before-break contact 232a and 232b applies ground over contacts 241, make-before-break contacts 232a and 232b of relay 230, contacts 235a, and contacts 240a to terminal #1 of bank 270 in each line-finder switch. As a result a line-finder in search of a calling line will pass over terminals #1. In that relay 310 does not operate to close contacts 311 in a line-finder until the line has been found, ground through contacts 231a, 236 to terminal 1 of bank 265 in all line-finders is rendered noninterfering.

ANSWER

When the called party answers, conversation can ensue over the established connection.

RELEASE

When the calling party hangs up, the calling subset opens the line loop. The trunk dial relay 200 restores, and at its contacts 201 removes the loop through the impedance coil 220 from the outgoing trunk circuit, which in turn releases the connection at the associated city exchange.

Trunk dial relay 200, at its contacts 202 also opens the circuit of the trunk hold relay 205, and removes ground from the control grid 225*c* of tube 225, thus causing the tube to be rendered less conducting, and thereby releasing line relay 230.

Line relay 230 restores, and at its contacts 231*b* opens the circuit of relay 240. After the elapse of an interval determined by its slow release, sleeved characteristics, the trunk hold relay 205 releases, in turn releasing the trunk over it. After a longer interval as determined by its slow release, sleeved and slugged characteristics, line release control relay 240 restores, and at its contacts 241 interrupts the ground which is holding the line cut-off relay 235 to restore same; and at its contacts 240*a* and 240*b*, transfers the circuit for terminals 1 of line-finder switch banks, such as 270, from the holding circuit of relay 235 to the start multiple in preparation for the next call.

Relay 235 restores, and at its contacts 236 disconnects ground from terminal 1 of banks, such as 265, in all of the line-finder switches.

The line and trunk circuits are thus returned to normal.

OPTIONAL WIRING FOR FIRST EXCHANGE DIGITS "1" AND "0"

It is recalled that for any exchange designation disallowed or restricted, no strapping is provided between the relay groups 430*b*–430*j* and 435*a*–435*j*. As a result relay 335 is not operated in a call to a restricted exchange, and when relay 325 releases following termination of the dialing of the three digit exchange code, message register 450 will be operated over a circuit extending from ground, over contacts 313*b*, 334*a*, 322*b*, 327*b*, 331*b*, 336*a*, A-wiring option conductor 399, and message register 450 to battery. It is apparent therefore that since relays such as 430*a* and 430*j* are not equipped for first digits "1" and "0," a condition similar to the strapping exists and message register 450 will operate with the dialing of "1" or "0" as the first exchange code digit.

The "disallowance" or restriction of dialing "1" and "0" as the first digit of the called exchange designation may be accomplished as described in the above section. However, if it is desired to release the register immediately upon dialling "1" or "0" as the first digit, optional wiring D and E can be selectively and respectively connected, causing relay 330 to operate during the interval between the release of relay 320 and 325 following the receipt of the first digit impulses. Such circuit may be traced from battery through the winding of relay 330, D-wiring or E-wiring, terminal 1 or 10 and wiper 361 of bank 360, contacts 328, 323, 327*a*, 322*b* and 313*a* to ground.

Relay 330 restores and at its contacts 332*a* releases relay 310. As relay 325 subsequently releases, it is effective at its contacts 327*a* and 328 to interrupt the circuit of relay 330, and relay 330 releases an interval thereafter as determined by its sleeved slow-to-release characteristics.

In the interval between the release of relay 325 and the release of relay 330, an operating circuit is completed for message register relay 450 which extends from ground over contacts 313*b*, 334*a*, 322*b*, 327*b*, 331*b*, 336*a*, A-wiring option, lead 399 and the winding of restriction message register 450 to battery. As relay 330 subsequently releases, it is effective at its contacts 331*b* to interrupt the circuit for the message register which restores to register a "disallowed" or restricted call.

The numerical switch 395 homes to terminals 30 over a circuit which extends from ground over contacts 313*b*, 334*b*, off-normal make contacts 397, interrupter contacts 341, and the winding of magnet 340 to battery. As the switch advances to terminal 30, the off-normal contacts change position to stop the switch.

The "allowance" or non-restriction of dialing "1" and "0" as the first digit of the called exchange designation may be accomplished by selectively and respectively connecting optional wiring X and Y to operate relay 335 during the above described interval between the release of relays 320 and 325 following pulsing of the first digit of the called exchange code.

It should be recalled that when relay 320 releases following pulsing of the third digit of the called exchange designation, relay 400 operates, and in turn operates relay 330 which effects the release of relays 310 and 325.

Relay 310 restores and at its contacts 313*b* completes a circuit for the message register relay 455, which extends from ground over contacts 313*b*, 334*a*, 322*b*, 327*b*, 331*b*, 336*b*, A-wiring option, lead 399*a*, the winding of non-restriction message register 455 to battery.

Message register relay 455 operates. With the subsequent release of relay 325, relay 330 is restored, and in turn restores the message register 455 causing it to step and count an "allowed" or non-restricted call.

A similar arrangement could be used for digits "1" or "0" on the second digit dialed (on terminals 11 and 20 of the second section of switch bank 355).

It is apparent from the foregoing that consideration of the number of calls indicated on the message registers gives an indication to the management of the P. B. X exchange as to whether steps should be taken to control unauthorized calls to "disallowed" exchanges.

TRUNK SCREENING

If, instead of using the equipment for traffic study purposes, it is desired to use the equipment for actually allowing or non-restricting calls to certain exchanges and disallowing or restricting calls attempted to certain other exchanges, B-wiring option (Figure 3) would be connected to provide a path from contacts 336*a* over conductor 280 and switch bank 260 of the line-finder switch 145 to restriction relays in the various trunks. The A-wiring options (Figure 3) would be disconnected, thus disconnecting the message registers. Then, instead of operating the restriction message register a restriction relay such as 210 in the calling trunk would be operated. Assuming trunk 1 to be the calling trunk, the operating path for restriction relay 210 extends from ground over contacts 313*b*, 334*a*, 322*b*, 327*b*, 331*b*, 336*a*, B-wiring option, conductor 280, wiper 261 and terminal 1 of line-finder switch bank 260 and restriction relay 210 to battery. Restriction relay 210 locks to ground over its contacts 214 and contacts 206 of trunk hold relay 205, so that when relay 330 subsequently releases, removing ground from the B-wiring option, the trunk restriction relay 210 will remain operated.

Restriction relay 210 in the trunk at contacts 211*a* and 212*a* disconnects the calling positive and negative wires from the outgoing trunk positive and negative wires, and at contacts 211*b* and 212*b* connects the wires alternatively to busy tone or to the P. B. X attendant.

If the first alternative is used, the calling party receives busy tone and disconnects, releasing connections. If the second alternative is used, G-wiring is connected and the restriction relay 210 operates an attendant's lamp associated with the calling trunk over an obvious circuit, notifying the attendant that a call to a "disallowed" or restricted exchange has been made. The attendant thereupon makes connection with the calling line by means of plug and jack or trunk key, as would be understood by one skilled in the art, and notifies the calling party that he has dialed a "disallowed" or restricted exchange designation. The calling attendant may instruct the subscriber to dial a different predetermined trunk digit to reach the attendant who will advance his call (making a notation of the same). When the calling party hangs up, the trunk dial relay 200 releases, in turn releasing the trunk hold relay 205 and the associated line circuit, and opening the loop to the city exchange.

When the trunk hold relay 205 releases, the holding circuit of the restriction relay 210 is opened, releasing the same.

If the call, instead of being disallowed and accordingly blocked or intercepted, is to be allowed, relay 335 will be operated as described hereinbefore and at its contacts **336*a* prevents ground from passing through the B-wiring option and bank 260** to the restriction relay. With the restriction relay in the trunk non-operated, the call progresses over the trunk without being blocked or intercepted.

Of course both A-wiring and B-wiring options may be connected and a registration of "allowed" and "disallowed" calls may be made in addition to the use of the equipment to actually allow the call to be extended, or to block or intercept the call.

Furthermore the same equipment may be initially connected at a location for traffic study by use of A-wiring, and later may be connected at the same location for actual restriction or non-restriction of calls by connecting B-wiring and the 260 bank, modifying the trunks to include the restriction relay and associated circuitry, and providing a trunk call lamp at the attendant's position if restricted calls are routed to an attendant.

FURTHER CONSIDERATION OF THE TRUNK SURVEY, TRAFFIC STUDY, AND SCREENING ARRANGEMENTS

A further consideration of the trunk survey, traffic study and screening arrangement is given at this point in order that this arrangement might be more thoroughly understood.

It should be recalled that only the second through the ninth finger holes of a metropolitan dial comprise letters for dialing. Accordingly, with 2–5 numbering, the first two digits of the called exchange code are in the directory as letters and the third digit of the called exchange code is listed as a number.

Accordingly, eight possibilities exist for the first digit; eight for the second; and ten for the third. This gives $8 \times 8 \times 10$ or 640 possibilities for called exchange codes. However, in certain exchanges 211 is used to reach a long distance operator, 411 to reach an information operator, and 611 to reach a repair clerk. Accordingly if this situation exists nine possibilities of the first three digits dialed exist, giving $8 \times 9 \times 10$ or 720 possibilities of the first three directory digits dialed.

The eight possibilities for the first digit dialed (i. e., 2–9) are represented by eight common survey relays **430*b* (shown), 430*c* (not shown), etc., 430*j*** (shown).

The nine possibilities for the second digit dialed (i. e., 1–9) are represented by nine common survey relays **435*a* (shown), 435*b* (shown), 435*c* (not shown), etc., 435*j*** (shown).

The ten possibilities for the third digit dialed (i. e., 1–0) are represented by ten terminals (21–30) in bank 345 of numerical switch 395; also in each numerical switch such as 395 in the other registers such as 150.

By reference to the schematics it can be seen that the ten terminals 21–30 of bank 345 are multiplied to ten make contacts **436*a* (shown), 436*b* (not shown), etc., 436*j* (shown) of relay 435*a*; to ten make contacts 437*a* (shown), 437*b* (not shown), etc., 437*j* (shown) of relay 435*b*, etc.; and to contacts 438*a* (shown), 438*b* (not shown), and 438*j* (shown) of relay 435*j***.

Now in order to provide for all 720 possibilities referred to hereinbefore, it would be necessary to multiply the ten circuits through contacts of all relays **435*a*–435*j* to corresponding contacts of each relay of the group 430*b*–430*j*. This would mean connecting each of the ninety circuits through the contacts of relays 435*a*–435*j* to ninety corresponding contacts of relay 430*b*; to ninety corresponding contacts of relay 430*c* (not shown), etc., to ninety corresponding contacts of relay 430*j***.

At one extreme if it were desired to allow or non-restrict all the automatic city trunk calls corresponding to all 720 possibilities this full multiple could be equipped, but this would be absurd or unnecessary as conventionally all calls can be allowed without special equipment.

At the other extreme if it were desired to disallow or restrict all the automatic city trunk calls corresponding to all 720 possibilities, no city trunks would be equipped, the P. B. X would become a P. X, and no special equipment would be needed.

In large P. B. X installations, without P. B. X toll ticketing, it is usually desirable to allow or non-restrict automatic city trunk calls corresponding to part of the 720 possibilities and to disallow or restrict calls corresponding to the remainder.

Now, in arriving at a practical solution where calls corresponding to part of the 720 possibilities are to be allowed or non-restricted and the remainder are to be disallowed or restricted, it is logical to provide survey equipment to allow or non-restrict if the lesser portion of the 720 combinations is to be allowed or non-restricted; but it is logical to provide survey equipment to disallow or restrict if the lesser portion of the 720 combinations is to be disallowed or restricted.

Inasmuch as in actual practice it is usually desirable to allow or non-restrict the lesser number and to disallow or restrict the greater number, the copending application hereinbefore referred to accordingly provided 720 terminals connected to individual contacts of first digit relays for the 720 possibilities but only strapped ground to those terminals corresponding to three digit combinations which it was desired to allow or non-restrict. Also, an economy was effected in this copending arrangement by operating the second digit relays in combination.

The present arrangement provides strapping between the terminals associated with contacts of the first digit relay group **430*b*–430*j* and the second digit relay group 435*a*–435*j* for those of the 720 possibilities which it is desired to allow or non-restrict. Accordingly an economy is effected in this arrangement by providing only enough contacts on the first digit relays to accommodate the maximum number of three digit calls to be handled by the three digit relays, with a margin of safety if desired, as determined by the local situation. In certain instances this allows the use of smaller relays and extensive saving in space. Accordingly the contacts on the first digit relay 430*b* are designated 431*a*, 431*b*, etc., to 431 last; etc., to 433*j***.

CONCLUSION

There has been set forth in the foregoing description a light, compact and economical type call surveying arrangement, which is readily adaptable for transporting from place to place, and which additionally, is sufficiently flexible to permit the use of the basic equipment for traffic study purposes or trunk screening, or both at the same time.

The economy of the arrangement is enhanced by the use of relatively inexpensive mechanical switches for the line-finding and numerical selection operations. The use of the mechanical switches in the disclosed arrangement minimizes the spare requirements, reduces the overall weight of the system, and reduces substantially the cost of the system. Additionally the use of the mechanical switches to provide a hunting type line-finder permits the elimination of a guard circuit, and the accrual of further obvious economies.

The numerous advantages of the novel strapping arrangement are, of course, apparent from the foregoing description. In brief summary such arrangement permits the use of fewer switches, fewer relays and fewer contacts, which in turn provides a more compact and more economical type call surveying system.

While we have illustrated and described what is regarded as the preferred embodiment of the invention, nevertheless it will be understood that such illustration is merely exemplary and that numerous modifications may be made therein without departing from the essence of the invention.

What is claimed is:

1. In an automatic telephone system having a plurality of exchanges including at least one private branch exchange, each exchange being operative to extend calls between local subscribers and the subscribers of other exchanges, means in at least said private branch exchange for surveying each call as extended by the subscribers of the private branch exchange to the subscribers of at least one other exchange, and means controlled by said survey means to automatically provide a cumulative number count of the calls made to said other exchange during any given period.

2. In an automatic telephone system having a plurality of exchanges including at least one private branch exchange, trunk means in the private branch exchange for extending calls between local subscribers and the subscribers of other exchanges, means connected common to the trunk means in said private branch exchange for surveying each call as extended by the subscriber over said trunk means, and means controlled by said survey means to automatically provide a cumulative number count of the calls made to at least one of said exchanges.

3. In an automatic telephone system having a plurality of exchanges including at least one private branch exchange, trunk means in each exchange for extending calls between the local subscribers and subscribers of other exchanges, survey means in at least the private branch exchange for surveying each call attempted to said other exchanges including class determining means for preassigning the other exchanges to predetermined classes, and means in said private branch exchange controlled by said survey means to automatically provide a cumulative number count of the calls made from said private branch exchange to each of the different classes of exchanges.

4. In an automatic telephone system having a plurality of exchanges including at least one private branch exchange, each exchange being operative to extend calls between the local subscribers and subscribers of other exchanges, means in at least said private branch exchange for surveying each call as made to said other exchanges including means for assigning the other exchanges to predetermined classes, restrictor means controlled by said survey means to restrict the calls attempted from said private branch exchange to at least one of said classes of exchanges, and means for automatically providing a cumulative number count of the calls attempted to said one class of exchange.

5. An automatic telephone system as set forth in claim 4 which includes optional circuit selection means for selectively rendering inoperative said means for automatically providing a cumulative number count of the restricted calls.

6. An automatic telephone system as set forth in claim 4 which includes optional circuit selection means for selectively rendering said restrictor means inoperative.

7. In an automatic telephone system having a plurality of exchanges including at least one private branch exchange, trunk means in each exchange for extending calls between the local subscribers and subscribers of other exchanges, survey means in at least said private branch exchange for surveying each call as made to said other exchanges including class determining means for preassigning the exchanges to predetermined classes, transition stage means for permitting removable connection of said survey means to various ones of said trunk means over a high impedance path, and means in the private branch exchange controlled by said survey means to automatically provide a cumulative number count of the calls from the private branch exchange to each of the different classes of exchanges.

8. In an automatic telephone system having a plurality of exchanges including at least one private branch exchange, means associated with each exchange for transmitting call routing digits including an exchange designator to effect extension of calls between local subscribers and subscribers of other exchanges, survey means in at least said private branch exchange for surveying the exchange designator of each call extended by the subscribers thereat, means for assigning exchanges having predetermined designations to a predetermined class, and means controlled by said survey means to automatically provide a cumulative number count of the calls made to said predetermined class of exchanges.

9. In an automatic telephone system having a plurality of exchanges divided into groups, each exchange being assigned an access number comprised of at least an exchange designator and a group designator; means for preassigning said exchanges to predetermined classes for survey purposes comprising marking means which indicate the assigned class of each exchange, and means for determining the class of the desired exchange simultaneously with the dialing of the exchange designator in the forwarding of a connection there towards, said marking means comprising a plurality of marking terminals, each of which represents one exchange in each of the groups, selection means including a set of selection contacts for extending an indicator path in the direction of the marker terminal for the exchange in each group which has a designation corresponding to the exchange designator dialed; a group selection means for each group of exchanges operative only with receipt of its associated group designator including a set of marker contacts each of which is controlled with operation of its associated selection means to prepare an individual marker circuit for one of the exchanges in its group, and removable strap means for connecting the marker contacts for each group to the ones of the marker terminals which represent the exchange individual to the marker contacts.

10. An automatic telephone system as set forth in claim 9 in which said marker arrangement for one class of exchanges comprises a signal producing means for each exchange of the said class, whereby with operation of a group relay and its marker contacts, a signal is extended over the operated ones of the selection contacts strapped thereto and to said indicator path, and which includes means connected in said indicator path operative responsive to such signal extension to effect operation of a first counting register.

11. An automatic telephone system as set forth in claim 10 in which said marking arrangement for an exchange of another class is indicated by the absence of a signal, whereby with operation of a group relay and its marker contacts, no signal is extended over the prepared indicator path, and which includes means operative responsive to such signal absence on said path to effect operation of a second counting register.

12. An automatic telephone system as set forth in claim 9 in which certain of the exchanges are identified as members of a first class by the connection of a signal to a marking terminal by a marker contact and others of said exchanges are identified as members of a second class by the absence of such signal, and in which the number of the marker contact sets in each group is equal to the number of exchanges in the group assigned to said first class.

13. In an automatic telephone system having a plurality of exchanges divided into groups of one hundred exchanges, each exchange being assigned an access number comprised of at least a hundreds, a tens and a units designator; means for extending calls from the subscribers of an exchange to the subscribers in the other exchanges responsive to the transmission of designator representative signals including the hundreds, tens and units designator of an exchange; means for assigning said exchanges to predetermined classes for survey purposes comprising a marking arrangement having a marking terminal for each exchange which is a member of a predetermined class; and means for determining the class of the desired exchange simultaneously with the dialling of the exchange hundreds, tens and units designator representative signals in the forwarding of a connection toward the desired exchange, said means comprising selection means including a set of selection contacts operative to prepare a path to the marker terminal for the exchange in each group which has a designation corresponding to the tens and units designator dialled; group selection means for each one hundred group of exchanges operative only with receipt of its associated hundreds designator, and a set of control contacts for each group selection means controlled with operation thereof to prepare marker circuits for each of the exchanges of its associated group in said class; and means for connecting the different control contacts of each group to the marker terminals which correspond to the tens and units digits of the exchange in the group represented by the marker contact.

14. In an automatic telephone system having a plurality of exchanges including at least one private branch exchange, each of which has an exchange code assigned thereto, trunk means in each exchange for extending a call to an indicated exchange responsive to the receipt of an exchange code, survey means connected common to the switching equipment in said private branch exchange for surveying each call as made to the other exchanges including a common set of marking units for preassigning certain of the exchanges to a predetermined class, and class determination means for determining the class of an exchange as indicated on said marking units, a plurality of register means associated with said trunk means for registering the exchange code as transmitted over said trunk means, means for selecting an idle register for use with seizure of said trunk means, means in each register for gaining access to said class determination means with the registration of a code thereon, and counting means operated by said survey means to automatically provide a cumulative number count as each call is extended to exchanges of said predetermined class.

15. In an automatic telephone system over which sets of digit-representing impulses are transmitted to effect selective call extension over associated switching equipment; a mechanical switch selectively operable to three different positions responsive to the receipt of three successive sets of digit-representing impulses, each position being representative of the number of impulses in the received sets; a first group of register relays, at least one of which is selectively operated in accordance with the first setting of the mechanical switch to indicate the digit represented by the first impulse set; a second group of register relays, at least one of which is selectively operated in accordance with the second setting of the mechanical switch to indicate the digit represented by the second impulse set; a plurality of control circuits, each being assigned a three digit access code, and means selectively actuated to select the control circuit indicated by the digits on said first and second registers and the third setting of the mechanical switch.

16. In an automatic telephone system including a private branch exchange over which sets of digit representing impulses are transmitted to effect selective call extension over associated switching equipment, said system having a plurality of exchanges divided into groups, each exchange being assigned an access number comprised of at least an exchange designator and a group designator, and survey means for making a record of calls extended to certain ones of said exchanges including a mechanical switch selectively operable to three different positions responsive to the receipt of three successive sets of digit representing impulses, each position being representative of the number of impulses in the received sets, a first group of register relays, at least one of which is selectively operated in accordance with the first setting of the mechanical switch to indicate the digit represented by the first impulse set, a second group of register relays, at least one of which is selectively operated in accordance with the second setting of the mechanical switch to indicate the digit represented by the second impulse set, and a plurality of marking circuits each of which corresponds to one of said certain exchanges, said marking circuits comprising a plurality of marker terminals, each of which represents one exchange in each of the groups, exchange selection means including a set of selection contacts for extending a path in the direction of the marker terminal for the exchange of each group which has a designation corresponding to the exchange designator dialled; a group selection means for each group of exchanges operative only with receipt of its associated group designator including a set of marker contacts each of which is controlled with operation of its associated selection means to prepare an individual marker circuit for one of the exchanges in its group, and removable strap means for connecting the marker contacts for each group to the ones of the marker terminals which represent the exchange individual to the marker contact, whereby an individual marking circuit for each of said certain exchanges is completed whenever the designator for such exchange is received.

17. An automatic telephone system as set forth in claim 16 in which said first group of register relays controls operation of said group selection means, and said second set of register relays and said third setting on said mechanical switch control in combination the operation of said exchange selection means.

References Cited in the file of this patent

UNITED STATES PATENTS

| | | |
|---|---|---|
| 2,445,000 | Ostline | July 13, 1948 |
| 2,485,748 | Kucera | Oct. 25, 1949 |
| 2,586,534 | Gray | Feb. 19, 1952 |
| 2,593,419 | Den Hertog | Apr. 22, 1952 |
| 2,613,278 | Stehlik | Oct. 7, 1952 |
| 2,748,195 | Faber | May 29, 1956 |